United States Patent [19]

Lermann et al.

[11] 4,032,935
[45] June 28, 1977

[54] EXPOSURE CONTROL FOR PHOTOGRAPHIC APPARATUS

[75] Inventors: Peter Lermann, Narring; Friedrich Stumpf, Munich; Gunter Fauth, Unterhaching, all of Germany

[73] Assignee: AGFA-Gevaert, A.G., Leverkusen, Germany

[22] Filed: May 10, 1976

[21] Appl. No.: 684,714

[30] Foreign Application Priority Data

May 16, 1975 Germany .......................... 2521824

[52] U.S. Cl. .................................. 354/29; 354/31; 354/59
[51] Int. Cl.² .......................................... G03B 7/14
[58] Field of Search ............... 354/29, 30, 38, 258, 354/31, 42, 43, 59, 26, 228, 231

[56] References Cited

UNITED STATES PATENTS

| 3,526,117 | 9/1970 | Kiper et al. | 354/29 |
| 3,810,204 | 5/1974 | Lermann et al. | 354/29 |
| 3,838,433 | 9/1974 | Imura | 354/29 |

*Primary Examiner*—L. T. Hix
*Assistant Examiner*—Michael L. Gellner
*Attorney, Agent, or Firm*—Peter K. Kontler; John Kurucz

[57] ABSTRACT

An exposure control for still cameras wherein a first portion of a diaphragm shutter is movable from cocked position to one of several second positions for effecting admission of scene light to an unexposed film frame, and a second portion of the shutter is movable from a first to a second position subsequent to movement of first shutter portion from the cocked position to terminate the exposure. The aperture size and the exposure time can be varied within a first range of light intensities which is monitored by a first photoresistor. The exposure time, at a selected aperture size, can be varied within a second range of light intensities which is monitored by a second photoresistor. The second range is contiguous to and merges gradually into the first range. The characteristic of the second photoresistor within the second range of light intensities can be changed by a wedge-like filter which is mounted in front of the second photoresistor and whose position can be changed by a pivotable or rotary selector of f/stops. The selector, or the first portion of the shutter, can actuate a switchover device which connects the first photoresistor in parallel with a first fixed resistor when the selector selects a first f/stop, and which connects the first photoresistor in parallel with a second resistor when the selector selects a different f/stop. The characteristic of the second photoresistor within the second range of light intensities can be varied by the filter in such a way that a curve which is indicative of variations of resistance of the second photoresistor within the second range of light intensities in a first position of the selector is substantially parallel to a curve which is indicative of variations of resistance of the second photoresistor within the second range of light intensities in a different position of the selector.

11 Claims, 6 Drawing Figures

EXPOSURE CONTROL FOR PHOTOGRAPHIC APPARATUS

BACKGROUND OF THE INVENTION

The present invention relates to photographic apparatus in general, and more particularly to improvements in electronic exposure controls for use in photographic apparatus, especially in still cameras. Still more particularly, the invention relates to exposure controls embodying a diaphragm shutter of the type wherein the making of an exposure is initiated by releasing a cocked first shutter portion which thereupon moves to one of several second positions at a speed which is determined by a retarding device and admits scene light to an unexposed film frame, and wherein the making of exposure is terminated by a second shutter portion which is caused to interrupt the admission of scene light with a delay following the movement of the first shutter portion from cocked position.

SUMMARY OF THE INVENTION

An object of the invention is to provide an exposure control which embodies a diaphragm shutter and is constructed and assembled in such a way that the user of the photographic apparatus can select the aperture size in advance, i.e., prior to the making of an exposure, for example, to select a relatively small aperture size for long exposure times and to thus improve the depth of field of the picture.

Another object of the invention is to provide a relatively simple, compact and inexpensive electronic exposure control with a diaphragm shutter which can be operated in the above outlined manner.

The invention is embodied in an exposure control for use in photographic apparatus (e.g., in still cameras). The exposure control comprises a diaphragm shutter which includes a first portion (e.g., a rotary carrier and a set of vanes which pivot in response to rotation of the carrier) movable from a first (cocked) position toward one of a plurality of second positions each of which corresponds to a different aperture size and/or a different exposure time whereby such movement of the first portion results in admission of scene light to the foremost unexposed film frame in the photographic apparatus, and a second portion (e.g., a set of pivotable or reciprocable blades) which is movable from a first position to a second position subsequent to movement of first shutter portion from its first position to thereby terminate the admission of scene light. The first shutter portion is preferably movable from its first position under the action of a spring, at a speed which is determined by a suitable retarding mechanism, in response to actuation of the camera release (e.g., a release including a pawl or a lever which normally engages a portion of the aforementioned carrier to hold the first shutter portion in cocked position). The second shutter portion can move to its second position in response to deenergization of an electromagnet which is energized prior or in response to actuation of the camera release and remains energized for an interval of time corresponding to the optimum aperture size and/or exposure time.

The improved exposure control further comprises first photosensitive means (preferably including a first photoresistor) having a characteristic such as to effect changes in exposure time and aperture size furnished by the shutter when the scene brightness varies within a first range; second photosensitive means (preferably including a second photoresistor) having a characteristic such as to effect changes in exposure time at a fixed aperture size when the scene brightness varies within a second range which is contiguous to the first range; a pivotable lever, a rotary ring or analogous selector means which is movable (e.g., by hand) between a plurality of positions in each of which the shutter is set to furnish a different maximum aperture size; and a filter, an adjustable auxiliary diaphragm or other suitable means for changing the characteristics of the second photosensitive means to a predetermined extent in response to movement of the selector means so as to insure that a transition from the characteristics of the first photosensitive means to the characteristic of the second photosensitive means takes place at the exact time when the shutter furnishes the maximum aperture as determined by setting of the selector means. The means for changing the characteristic of the second photosensitive means may be mechanically connected with the selector means, and the change in the characteristic of second photosensitive means is preferably such that the curve which represents variations of resistance of the second photosensitive means within the second range of scene brightness at a first setting of the selector means is substantially parallel to a curve representing variations in resistance of second photosensitive means within the second rnage at a different setting of the selector means.

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
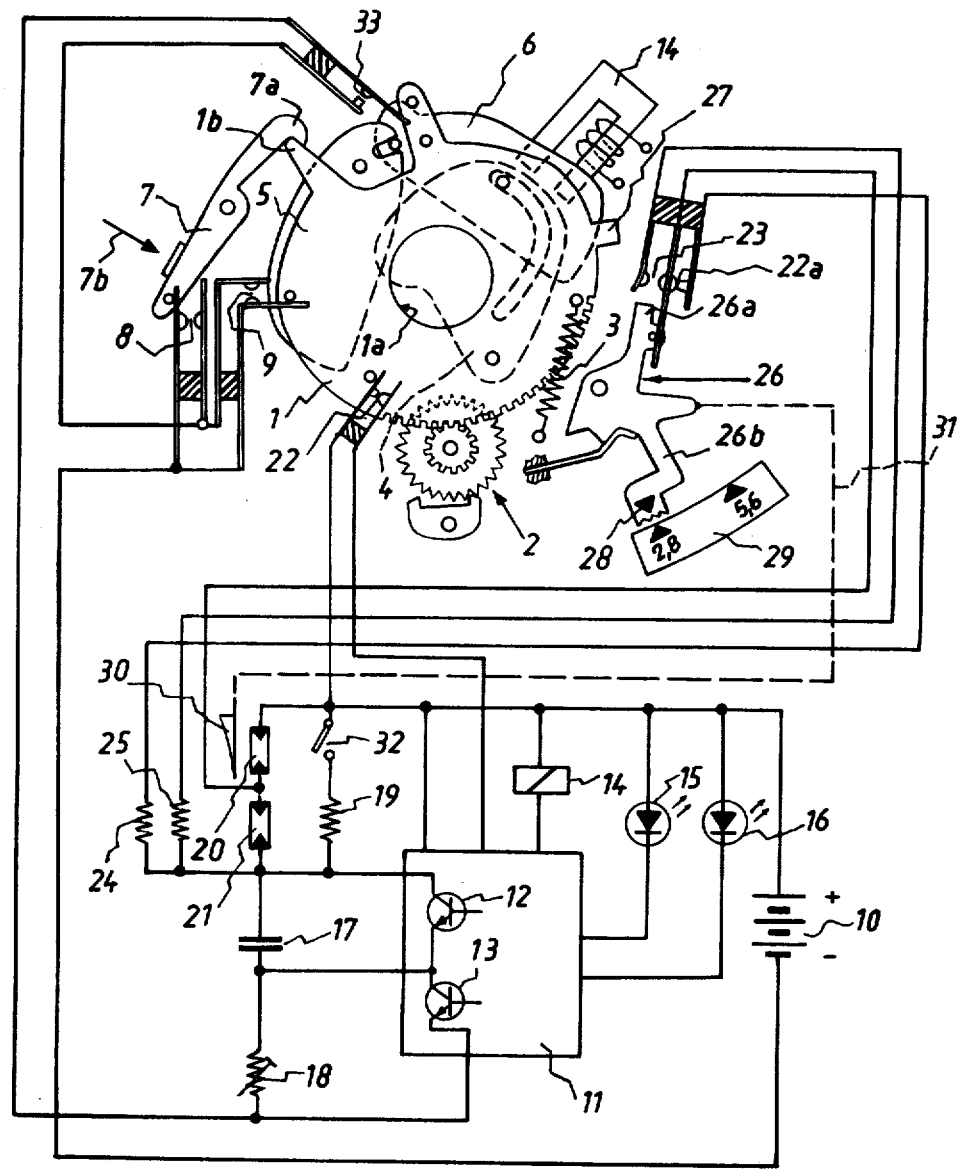
FIG. 1 is a schematic view of an exposure control which embodies one form of the invention.

Referring first to FIG. 1, there is shown a portion of a photographic apparatus which comprises a diaphragm shutter having a first portion including a rotary carrier 1 which is biased by a spring 3 so that it tends to turn clockwise from the first or cocked position of FIG. 1 and is engaged by a retarding mechanism 2 which determines the speed of movement of the carrier from its first position. The carrier 1 supports a set of blades or vanes 4 (only one shown for the sake of clarity) which, when the carrier turns clockwise, enable scene light to enter the camera by way of an opening 1a located in front of an unexposed film frame. The shutter further comprises a second portion including a set of vanes or blades 5, 6 which can be moved from the first positions shown in FIG. 1 to second positions to thereby overlie the opening 1a and to thus terminate an exposure. The means for holding the carrier 1 in the first or cocked position of FIG. 1 comprises a pivotable release lever 7 having a pallet 7a which engages a projection 1b of the carrier. The direction in which the release lever 7 must be pivoted by hand or by remote control in order to initiate the making of an exposure is indicated by arrow 7b. The lower arm of the release lever 7 cooperates with two electric switches 8, 9 which can connect a battery or another suitable energy source 10 with the electrical components of the exposure control.

The exposure control further comprises an integrated electronic module 11 whose construction is similar with or identical to that disclosed in commonly owned U.S. Pat. No. 3,798,663 granted Mar. 19, 1974 to Wagensonner et al. The module 11 comprises two transistors 12 and 13 one of which is conductive when the other is non-conductive, and vice versa, an electromagnet 14, two light-emitting diodes 15, 16 which respectively indicate sufficiency and insufficiency of scene brightness, a capacitor 17, a variable indicator resistor 18, a fixed resistor 19 which is used when the photographic apparatus is connected with a flash unit, two series-connected photoresistors 20, 21, and a starter switch 22.

The photoresistor 21 measures a first range of scene brightness in which the aperture size varies simultaneously with exposure time during actuation of the shutter. The photoresistor 20 measures a second range of scene brightness which is contiguous to and merges gradually into the first range, and in which the aperture size remains constant while the exposure time changes in dependency on changes in scene brightness.

The photographic apparatus further comprises a switchover device 22a, 23 which can be actuated to connect the photoresistor 21 in parallel with a resistor 24 or with a resistor 25. The means for actuating the switchover device 22a, 23 comprises a pivotable selector lever 26 having a projection or lug 26a which is movable into or from the path of movement of a projection or lug 27 on the carrier 1. An arm 26b of the selector lever 26 carries an index or marker 28 which can be moved into register with the graduations of a fixedly mounted scale 29. The graduations of the scale 29 represent different f/stops. FIG. 1 shows two f/stops 2.8 and 5.6. When the index 28 registers with the f/stop 2.8, the switchover device 22a, 23 connects the photoresistor 21 in parallel with the resistor 24. The resistor 25 is connected in parallel with the photoresistor 21 when the index 28 registers with the f/stop graduation 5.6 of the scale 29. The resistance of resistor 24 is greater than that of the resistor 25 because the resistance of photoresistor 21 at the transfer point $K_1$ of FIG. 2 exceeds the resistance at the transfer point $K_2$. The resistance of the resistors 24 and 25 is selected in such a way that, with reference to intensity of scene light at the respective transfer points, the influence of the photoresistor 21 is reduced and finally eliminated with decreasing scene brightness.

When the release lever 7 is pivoted sufficiently to close the switch 8, the light-emitting diode 15 furnishes a visible signal if the intensity of scene light is sufficient for the making of an exposure. The user of the camera then pivots the lever 7 again to close the switch 9 and to thus cause the exposure control to make an exposure. If the closing of switch 8 results in the generation of a visible signal by the light-emitting diode 16, the user knowns that the scene brightness is unsatisfactory, i.e., that the release lever 7 should not be pivoted to the extent which is necessary to close the switch 9.

The electromagnet 14 is shown twice, once in the circuit of the module 11 and once adjacent to the vane 6. When the electromagnet 14 is deenergized, it allows or causes the vanes 5, 6 to overlie the opening 1a and to thereby terminate the exposure.

When the selector lever 26 assumes the position of FIG. 1, its projection 26a closes the element 22a of the switchover device 22a, 23 to connect the resistor 24 in parallel with the photoresistor 21. The projection 26a is then located outside of the path of movement of the lug 27. Therefore, the spring 3 can turn the carrier 1 through a larger angle so that the vanes 4 expose a larger portion of (or the entire) opening 1a before the vanes 5, 6 close the shutter. When the selector lever 26 maintains its index 28 in register with the f/stop graduation 5.6 of the scale 29, the component 22a of the switchover device 22a, 23 is open and the component 23 is closed to connect the resistor 25 in parallel with the photoresistor 21. The projection 26a is then located in the path of movement of the lug 27 to intercept the carrier 1 during an earlier stage of clockwise movement under the bias of the spring 3 so that the first portion 1, 4 of the shutter comes to a halt when the vanes 4 expose a relatively small part of the light-admitting opening 1a.

The manner in which the two portions of the shutter can be returned to the first positions shown in FIG. 1 is not shown in the drawing. Such movements of the shutter portions can be effected by the film transporting mechanism, not shown.

Figure 2:
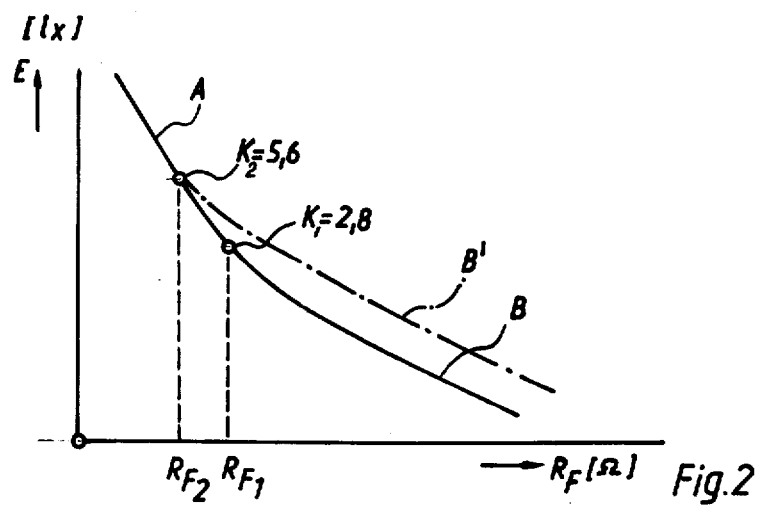
FIG. 2 is a diagram of characteristic curves of the photoresistors in the exposure control of FIG. 1.

Referring to FIG. 2, the resistance (in ohms) of the photoresistor 21 (with or without the resistor 24 or 25) and the resistance of the photoresistor 20 is measured along the abscissa, and the scene brightness E is measured along the ordinate. The characteristic curve of the assembly including the photoresistors 20, 21 and resistors 24, 25 represents the variations of resistance as a function of changes in scene brightness. The photoresistors 21 is effective in the range represented by the curve A ending at the transfer point $K_1$ or $K_2$. The photoresistor 20 is effective in the range represented by the curve B or B' which is contiguous to the curve A. As shown in FIG. 1, the resistor 20 is mounted behind a wedge-like grey filter 30 having portions of different light-transmissivity. The curve B' is generally parallel to the curve B and is shifted relative to the curve B to an extent corresponding to a light intensity value which is effected by a reduction of photocurrent resulting from appropriate adjustment of the filter 30 relative to the photoresistor 20. The arcuate shape of the curve B or B' in the region of the transfer point $K_1$ or $K_2$ (with gradual transition into the curve A) insures a reduction of exposure error during the time interval immediately following the movement of carrier 1 to that a second position which is determined by the setting of selector lever 26.

The position of the filter 30 (which is located in the path of incoming scene light) can be changed in response to pivoting of the selector lever 26. The mechanical connection between the lever 26 and filter 30 indicated in FIG. 1 by a broken line 31. The normally open switch 32 of FIG. 1 is closed automatically in response to attachment of a flash unit, not shown. The reference character 33 denotes a switch which closes when the vanes 5, 6 close the shutter.

The manner in which the improved exposure control makes exposures will be readily understood upon perusal of the preceding description and upon perusal of the U.S. Pat. No. 3,798,663 whose disclosure is incorporated herein by reference. The module 11 insures that the exposure control can furnish different exposure times and different aperture sizes when the scene brightness is relatively high. When the scene brightness is relatively low, the carrier 1 is invariably allowed to move to a position which is determined by the setting of the selector lever 26 before the electromagnet 14 allows or causes the vanes 5, 6 to terminate the admission of scene light via opening 1a, i.e., the shutter invariably furnishes the maximum selected f/stop. The filter 30 then insures that the characteristic of the photoresistor 20 varies in accordance with the curve B or B', depending on the selected maximum size of the aperture. The transition from the characteristic of the photoresistor 21 (curve A) to the characteristic of the photoresistor 20 (curve B or B') takes place at the transfer point $K_1$ or $K_2$ corresponding to the maximum size of the selected aperture (f/stop 2.8 or 5.6). The effect of the photoresistor 21 is eliminated at the transfer point $K_1$ or $K_2$ (depending on the setting of the lever 26) and the photoresistor 20 becomes fully effective. Thus, the timing of transition from the curve A to the curve B or B' is shifted in dependency on the size of the selected maximum aperture. The adjustment of selector lever 26 entails an appropriate adjustment in the position of filter 30 relative to the photoresistor 20 and hence an appropriate change in the intensity of scene light which impinges on the photoresistor 20. This, in turn, entails a change of the characteristic of the photoresistor 20, i.e., a shift from the curve B to the curve B' or vice versa, whereby the curve B or B' is shifted in substantial parallelism with itself as clearly shown in FIG. 2. The effect of the photoresistor 20 upon the exposure time becomes fully felt as soon as the aperture reaches a size which has been selected by the lever 26.

It is clear that the wedge-like filter 30 constitutes but one of several means which can be used to regulate the intensity of scene light which impinges upon the photoresistor 20 in dependency on the setting of selector lever 26. For example, this filter can be replaced by an auxiliary diaphragm (not shown) whose aperture varies as a function of changes in the position of the selector lever 26 to thereby changes the amount of scene light which reaches the light-sensitive surface of the photoresistor 20. All that counts is to provide some suitable means for changing the light intensity-resistance characteristic of the photoresistor 20 in parallelism with itself in response to adjustment of the means for selecting the maximum size of the aperture.

The resistor 24 or 25 insures that the shutter can close before the carrier 1 reaches that second position which is determined by the selector lever 26, i.e., that the exposure time can be less than that which must elapse in order to enable the carrier 1 to move from the cocked position of FIG. 1 to a position corresponding to the f/stop 2.8 or 5.6. The maximum size of the aperture is then determined by the length of the exposure time, i.e., by the length of the interval beginning with start of movement of carrier 1 from the cocked position of FIG. 1 and ending when the electromagnet 14 causes or allows the vanes 5, 6 to overlie the opening 1a before the carrier 1 reaches a position in which the f/stop equals that which is selected by the setting of the lever 26.

Figure 3:
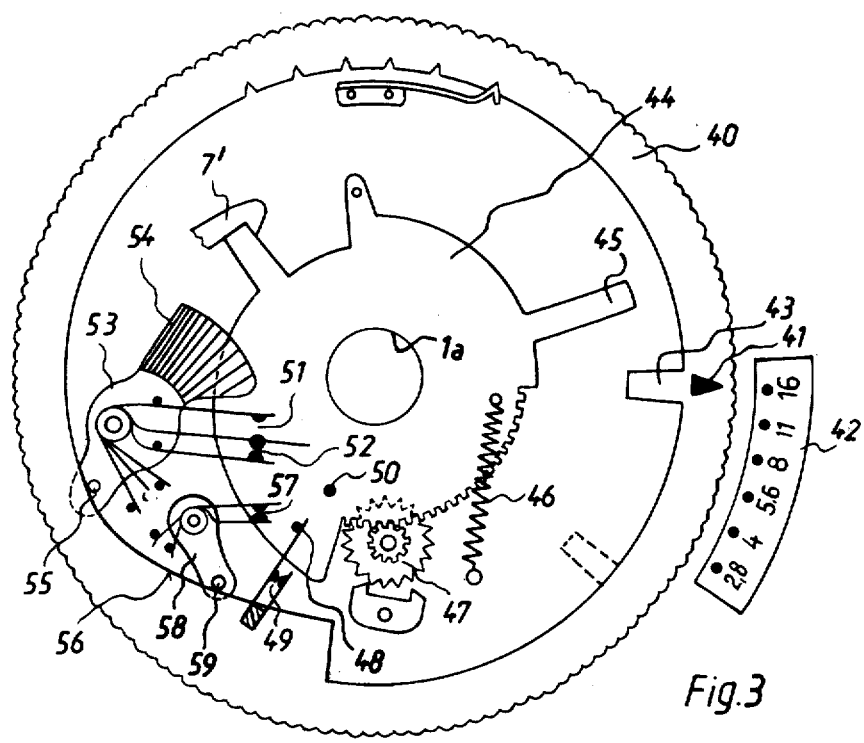
FIG. 3 is a schematic plan view of the diaphragm shutter in a second exposure control.
Figure 4:
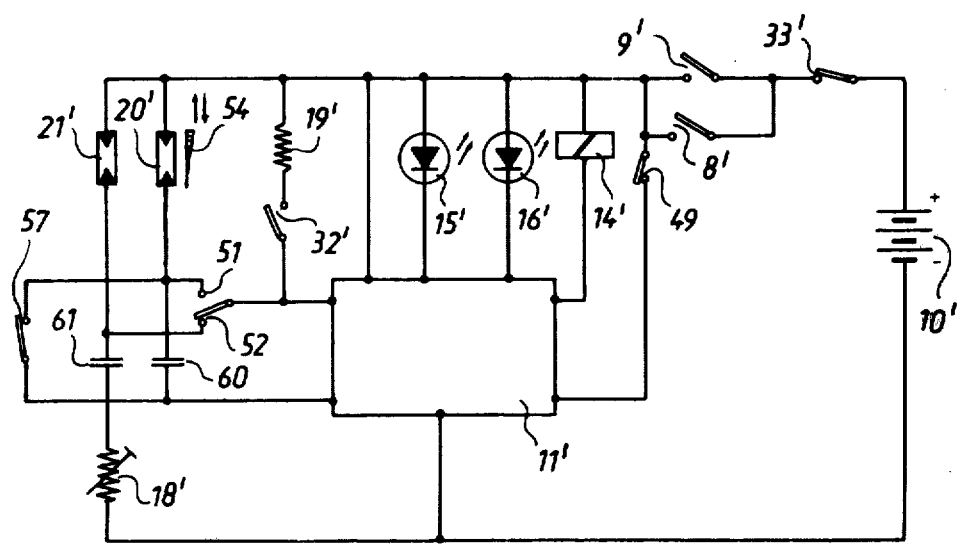
FIG. 4 is a circuit diagram of the exposure control which embodies the diaphragm shutter of FIG. 3.

FIGS. 3 and 4 show a portion of a second photographic apparatus wherein the exposure control comprises a ring-shaped rotary selector 40 having an index or marker 41 movable into register with selected graduations of a fixedly mounted f/stop scale 42. The inwardly extending projection 43 of the selector 40 constitutes an abutment for the projection or lug 45 of a carrier 44 for shutter opening vanes or blades (not shown) which is biased (not shown) which is biased clockwise by a helical spring 46 and whose speed of movement from the first or cocked position of FIG. 3 is determined by a retarding mechanism 47. A pin-shaped trip 48 of the carrier 44 can close a normally open starter switch 49 for the circuit including 21'. A further pin-shaped trip 50 of the carrier 44 can actuate a switchover device 51, 52 (corresponding to 22a, 23 of FIG. 1) which is mounted on a pivotable support 53. The switch 51 of the device 51, 52 is closed in the cocked position of carrier 44; it is opened by the pin-shaped trip 50 of the carrier 44 when the latter rotates under the bias of the spring 46 whereby the trip 50 closes the switch 52. The support 52 further carries a wedge-like grey filter 54 corresponding to the filter 30 of FIG. 1. A pin-shaped follower 55 of the support 53 tracks the face of a cam 56 forming part of or being rigidly connected to the selector 40. A starter switch for the circuit including 20' is shown at 57; this switch is mounted on a pivotable holder 58 having a pin-shaped follower 59 serving no track the adjacent portion of the face of the cam 56 on the selector 40. The trip 48 allows the switch 49 to open when the carrier 44 begins to rotate under the action of the spring 46, and the trip 48 thereupon opens the switch 57 with a predetermined delay.

FIG. 4 shows certain components of the structure of FIG. 3 as well as additional components of the exposure control. Such additional components are identified by reference characters which are similar to those denoting the corresponding parts of the exposure control of FIG. 1 (but each followed by a prime).

The photoresistor 20' of FIG. 4 is connected in series with a first capacitor 60, and the photoresistor 21' is connected in series with a second capacitor 61. When the user of the camera chooses a particular f/stop by appropriate angular displacement of the selector 40, the cam 56 changes the angular position of the support 53 through the medium of the follower 55 to thereby change the position of the switchover device 51, 52 relative to the trip 50. At the same time, the cam 56 causes the follower 59 to change the position of the holder 58 and hence the position of the starter switch 57 relative to the trip 48 and starter switch 49.

The delay is actuation of the exposure time determining circuit 20', 60 relative to the exposure time determining circuit 21', 61 causes the aforediscussed shift of the curve B' relative to the curve B and a gradual transition of the curve A into the curve B or B'. A stepped transition from the curve A into the curve B or B' would result in an exposure error in the region immediately adjacent to the transfer point of the characteristic curve.

The delay between the actuation of exposure time determining circuits 20', 60 and 21', 61 depends on the size of the aperture which is chosen by the selector 40. The delay decreases if the selector 40 is rotated in a direction to select a smaller f/stop.

Figure 5:
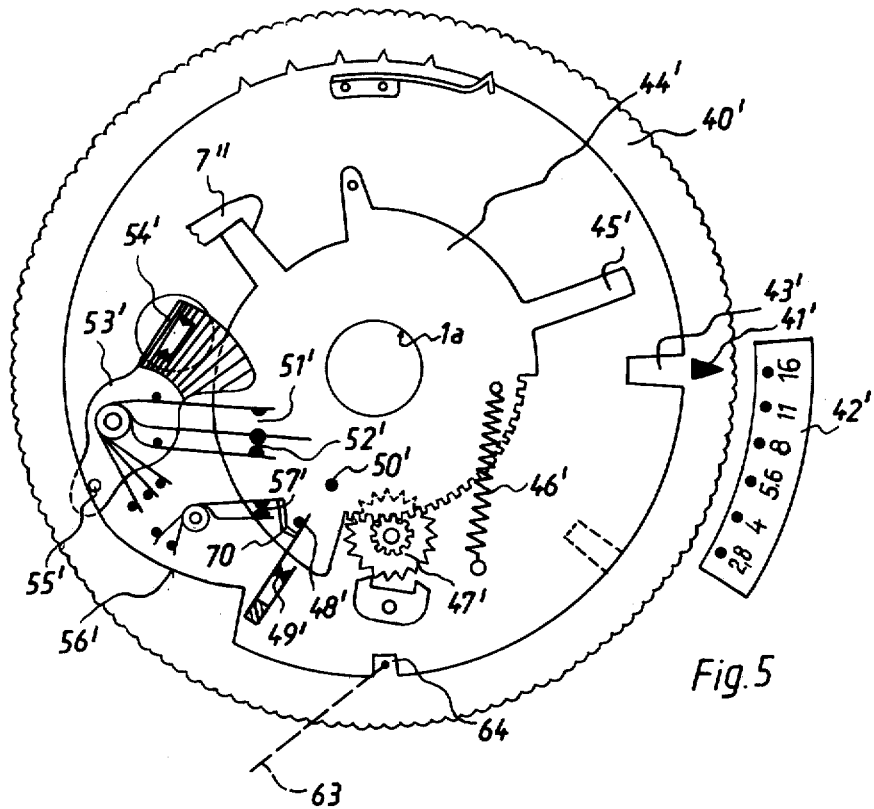
FIG. 5 is a schematic plan view of the diaphragm shutter in a third exposure control.
Figure 6:
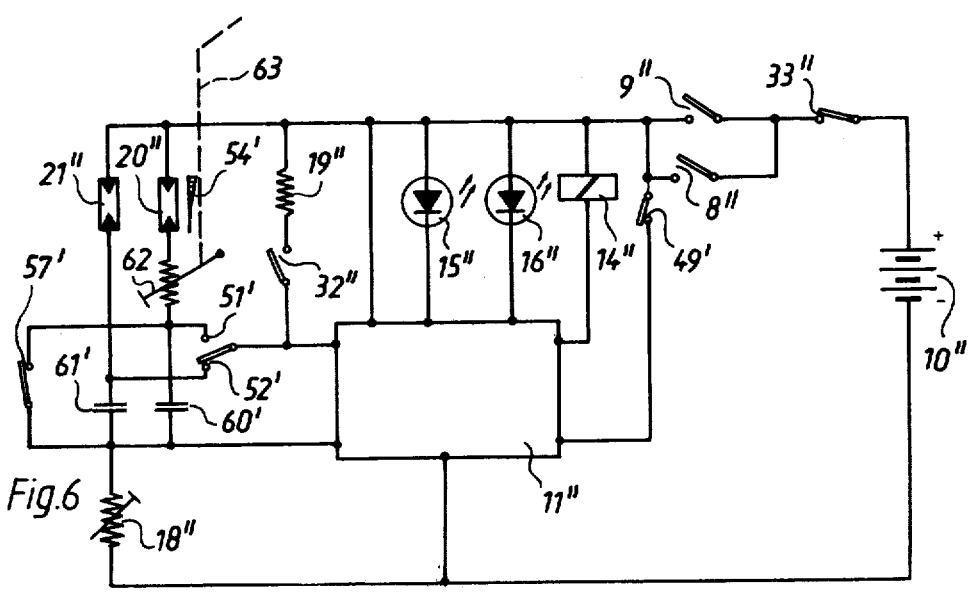
FIG. 6 is a circuit diagram of the exposure control which embodies the shutter of FIG. 5.

The exposure control of FIGS. 5 and 6 constitutes a modification of the structure which is shown in FIGS. 3 and 4. The parts corresponding to those shown in FIG. 1 are denoted by similar reference characters plus two primes, and the parts corresponding to those shown in FIGS. 3–4 are denoted by similar reference characters each followed by a single prime.

The photoresistor 20" of FIG. 6 is in series with a variable resistor 62 which is adjustable by a portion 64 of the selector 40' of FIG. 5 through the medium of a mechanical connection 63 which is indicated by broken lines. Furthermore, the starter switches 49', 57' of FIG. 5 are actuated simultaneously by trip 48' due to the provision of a mechanical connection 70 between their movable contacts. The arcuate portion of the curve B or B' is due to the provision of the resistor 62 whose resistance decreases with increasing resistance of the photoresistor 20", i.e., in response to a reduction of the selected size of the aperture.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a photographic apparatus, an exposure control comprising a diaphragm shutter including a first portion movable from a first position toward one of a plurality of second positions each of which corresponds to a different aperture size whereby such movement of said first portion results in admission of scene light, and a second portion movable from a first position to a second position subsequent to movement of said first portion from said first position to thereby terminate the admission of scene light; first photosensitive means having a characteristic such as to effect changes in exposure time and aperture size furnished by said shutter within a first range of scene brightnesses; second photosensitive means having a characteristic such as to effect changes in exposure time at a fixed aperture size within a second range of scene brightnesses which is contiguous to said first range; selector means movable between a plurality of positions in each of which said shutter is set to furnish a different maximum aperture size; and means for changing the characteristic of said second photosensitive means to a predetermined extent in response to movement of said selector means so as to insure the transition from the characteristic of said first photosensitive means to the characteristic of said second photosensitive means when said shutter furnishes the maximum aperture selected by said selector means.

2. An electronic exposure control as defined in claim 1, wherein said shutter further comprises means for urging said first portion from said first position and means for determining the speed of movement of said first portion from said first position, said second range of scene brightnesses merging gradually into said first range.

3. An exposure control as defined in claim 1, wherein said selector means is movable by hand between said positions thereof and comprises a portion movable into the path of movement of said first shutter portion from said first position to thereby determine the extent of movement of said first shutter portion from said first position.

4. An exposure control as defined in claim 1, wherein each of said photosensitive means comprises a photoresistor and said characteristics represent variations of resistance of said photosensitive means in response to variations of scene brightness, a curve which is indicative of the characteristic of said second photosensitive means in a first position of said selector means being substantially parallel to a curve which is indicative of the characteristic of said second photosensitive means in a second position of said selector means.

5. An exposure control as defined in claim 1, wherein said means for changing the characteristic of said second photosensitive means comprises a filter having portions of different light transmissivity and means for moving said filter relative to said second photosensitive means in response to movement of said selector means, said filter being disposed between incident scene light and said second photosensitive means.

6. An exposure control as defined in claim 1, wherein said means for changing the characteristic of said second photosensitive means comprises an adjustable diaphragm interposed between incident scene light and said second photosensitive means, and means for adjusting said diaphragm in response to movement of said selector means.

7. An exposure control as defined in claim 1, wherein said first and second photosensitive means respectively comprise first and second photoresistors connected in series with each other, said first photosensitive means further comprising first and second resistor means and said exposure control further comprising switchover means actuatable by said selector means to connect said first photoresistor in parallel with said first resistor means in a first position of said selector means and to connect said first photoresistor in parallel with said second resistor means in a second position of said selector means.

8. An exposure control as defined in claim 7, wherein the combined resistance of said first photoresistor and said first resistor means in said first position of said selector means and the combined resistance of said first photoresistor and said second resistor means in said second position of said selector means do not exceed a value which is indicative of the point of transition from said first to said second range of scene brightnesses.

9. An exposure control as defined in claim 1, wherein said first and second photosensitive means respectively form part of first and second exposure time determining circuits which respectively include first and second photoresistors, and further comprising switchover means actuatable by said first shutter portion to complete said circuits and means for changing the position of said switchover means with respect to said first shutter portion in response to movement of said selector means between said positions thereof.

10. An exposure control as defined in claim 9, wherein the delay between completion of said first circuit and completion of said second circuit is respectively longer and shorter when said selector means is respectively moved to first and second positions which respectively correspond to adjustment of said shutter to furnish longer and shorter exposure times.

11. An exposure control as defined in claim 9, wherein said first shutter portion comprises means for completing said first circuit substantially simultaneously with said second circuit, and further comprising variable resistor means connected in series with said second photoresistor and means for adjusting said variable resistor means in response to movement of said selector means.

* * * * *